United States Patent
Jacotot et al.

(10) Patent No.: US 9,965,963 B2
(45) Date of Patent: May 8, 2018

(54) TRAJECTORY MONITORING

(71) Applicant: THALES, Courbevoie (FR)

(72) Inventors: Grégoire Jacotot, Valence (FR); Cédric Flaven, Valence (FR); Laurent Flotte, Toulouse (FR)

(73) Assignee: THALES, Courbevoie (FR)

( * ) Notice: Subject to any disclaimer, the term of this patent is extended or adjusted under 35 U.S.C. 154(b) by 0 days. days.

(21) Appl. No.: 15/171,887

(22) Filed: Jun. 2, 2016

(65) Prior Publication Data
US 2016/0358482 A1 Dec. 8, 2016

(30) Foreign Application Priority Data

Jun. 5, 2015 (FR) ...................................... 15 01164

(51) Int. Cl.
G08G 5/00 (2006.01)
G05D 1/00 (2006.01)
G06F 11/16 (2006.01)

(52) U.S. Cl.
CPC ......... *G08G 5/0047* (2013.01); *G05D 1/0077* (2013.01); *G06F 11/16* (2013.01)

(58) Field of Classification Search
CPC ..... G08G 5/0047; G05D 1/0077; G06F 11/16
See application file for complete search history.

(56) References Cited

U.S. PATENT DOCUMENTS

| | | | |
|---|---|---|---|
| 2007/0022348 A1 | 1/2007 | Racunas et al. | |
| 2010/0010692 A1 | 1/2010 | Broderick et al. | |
| 2012/0092193 A1 | 4/2012 | Perrie et al. | |
| 2012/0191332 A1* | 7/2012 | Sawhill | G08G 5/0013 701/120 |
| 2013/0184899 A1 | 7/2013 | Raynaud et al. | |
| 2015/0254989 A1* | 9/2015 | Kozlow | G08G 5/0039 701/466 |
| 2016/0078769 A1* | 3/2016 | Coulmeau | G01C 21/20 701/537 |

* cited by examiner

*Primary Examiner* — Calvin Cheung
(74) *Attorney, Agent, or Firm* — Baker & Hostetler LLP (57) ABSTRACT

A method for monitoring the flight trajectory of an aircraft comprises the steps reiterated in time consisting in receiving and comparing two trajectory objects, the trajectory objects being associated with two initially identical flight trajectories determined independently of each other over time; and, in case of difference between the two trajectory objects, determining a failed trajectory from the two flight trajectories by comparison with the last known state without fault, the last known state without fault corresponding to two identical trajectory objects. Developments describe the use of flight plan segments, of signatures, fault isolation simultaneously to a change of current leg, the use of levels of operational safety according to an RNP-AR procedure and the notification of the pilot of the trajectory determined as having failed. Software and system aspects are also described.

15 Claims, 5 Drawing Sheets

TRAJECTORY MONITORING

CROSS-REFERENCE TO RELATED APPLICATIONS

This application claims priority to foreign French patent application No. FR 1501164, filed on Jun. 5, 2015, the disclosures of which are incorporated by reference in their entirety.

FIELD OF THE INVENTION

The invention relates to the field of systems and methods for monitoring the trajectory of an aircraft.

BACKGROUND

Systems and methods for managing the trajectory of an aircraft must meet demanding operational safety conditions.

In particular, RNP-AR type aerial operations are demanding. The required navigation performance (RNP) may be authorisation required (AR). RNP designates procedures that have been created to specify the conditions to be met as regards airspace and its use. RNP-AR procedures are able to provide significant benefits in terms of use and safety relative to other surface navigation procedures (RNAV) by prescribing an enhanced navigation functionality, integrity and precision so as to enable operations using smaller minimal obstacle clearances, which make it possible to implement approach and departure procedures in situations where the application of other procedures is not realisable or acceptable from the operational point of view.

For example in such an RNP-AR context, regulations require the aircraft to be kept in a corridor of 2×RNP around the reference trajectory in case of what is called a remote fault (with a fault probability comprised between $10^{-5}$ and $10^{-7}$ per operation).

In particular, in the configuration of a conventional dual system (two independent navigation chains), a fault in one of the chains (or "sides") of the system—implying the undesired modification of the trajectory to which the aircraft is slaved—must be able to be detected and above all isolated in order to continue the flight on the side without fault.

Patent document US2012/0092193 entitled "Method And Device For Aiding The Managing Of Air Operations With Required Navigation And Guidance Performance" discloses a method and device for assisting with the conduct of aerial operations requiring a guarantee of navigation performance and guidance in an RNP-AR context. The disclosure requires the use of N systems, N being an integer higher than or equal to 3. Approaches involving triplex architectures have limitations.

Other known existing approaches involve the use of TAWS or manual means for crosschecking monitoring means. These approaches also have limitations.

There is a need for advanced methods and systems especially allowing operational safety requirements to be covered, especially in an RNP-AR context.

SUMMARY OF THE INVENTION

The present invention relates to a method for monitoring the flight trajectory of an aircraft comprising the steps reiterated in time consisting in receiving and comparing two trajectory objects, said trajectory objects being associated with two initially identical flight trajectories determined independently of each other over time; and, in case of difference between the two trajectory objects, determining a failed trajectory from the two flight trajectories by comparison with the last known state without fault, the last known state without fault corresponding to two identical trajectory objects. Developments describe the use of legs (or flight plan segments) or signatures, fault isolation simultaneously to a change of current leg, the use of levels of operational safety according to an RNP-AR procedure and the notification of the pilot of the trajectory determined as having failed. Software and system (e.g. FMS, FWS) aspects are also described.

The invention allows the detection and isolation of a fault in the trajectory calculation function in a dual system. It consists in a function, which is optionally independent of the two navigation chains, the aim of which is to monitor the trajectories of each navigation chain, to detect a fault in one of the chains and to alert the crew.

The operating principle of the invention is based on the continuous comparison of the trajectories of each of the two navigation chains. In the absence of a fault, the two trajectories are identical and stable. When a fault in one of the two chains occurs, a difference between the trajectories appears and it is possible to identify the side that has faulted by comparing it to the last state without fault.

According to one aspect of the invention, the solution allows the detection and isolation of a fault in the trajectory calculation function in a dual navigation system, thereby making it possible to greatly decrease the probability of excursion beyond limits set by operational safety requirements during this type of fault.

Advantageously, the method according to the invention makes it possible to significantly decrease the probability of excursion beyond limits set by operational safety requirements (e.g. trajectory fault in one of the chains of the dual navigation system). The probability of excursion far from the trajectory may be decreased if not optimised.

Advantageously, the method according to the invention by automatically identifying the portion or side of the dual system that has faulted (without recourse to other means during this type of fault), the invention makes it possible to decrease the cognitive load on the crew and may therefore limit the complexity of the system (i.e. without recourse to a triplex configuration comprising three chains).

In particular in a dual system in which for a single chain the probability of occurrence of this fault exceeds $10^{-5}$ per operation, the invention may make it possible to use the system for RN P-AR operations.

Advantageously, the method implemented in a dual navigation system allows the automatic isolation of a fault in the trajectory calculation function in one of the navigation chains. The expression "isolate a fault" is understood to mean the fact of detecting the occurrence of a fault (determining the existence of a problem) and of determining which of the two chains has failed (more precisely determining the origin of the fault or its perimeter or the characteristics or properties of the fault). In existing systems, the crew must implement other means to identify a fault and/or to change navigation means to continue the flight; in an RNP-AR context, the implementation of these existing means has limitations and insufficiencies in terms of operational safety.

Advantageously, according to certain embodiments of the invention, the implementation of the means may be automatic and therefore save any additional delay in additional analysis and reaction on the part of the crew, which delay could also contribute also to increasing an excursion depending on the circumstances.

BRIEF DESCRIPTION OF THE DRAWINGS

Various aspects and advantages of the invention will become apparent from the description of one preferred but nonlimiting mode of implementation of the invention, given with reference to the figures below.

DETAILED DESCRIPTION

A method is disclosed for monitoring the flight trajectory of an aircraft comprising the steps reiterated in time consisting in receiving and comparing two trajectory objects, said trajectory objects being associated with two initially identical flight trajectories determined independently of each other over time; and at a given instant, in case of difference between the two trajectory objects, determining the failed trajectory from the two flight trajectories by comparison with the last known state without fault, the last known state without fault corresponding to two identical trajectory objects.

The "last state without fault" may be defined as the last state in which the two trajectories were identical. To detect a fault simultaneously to a change of current leg, knowledge of the provided state after change thus also allows the provided last state without fault to be known and therefore isolated in case of a fault simultaneously to a change of current leg.

The two trajectories are determined independently of each other and under identical initial conditions. The continuously recalculated trajectory determinations must therefore be congruent over time, modulo a short temporal delay for the conclusion of the associated calculations. Because of this assumed symmetry, the results must be identical, save a) case of simultaneous fault in the two independent determinations and/or b) change of trajectory (e.g. change of leg, following manual modifications made by the pilot). The comparison with the last state without fault solves the indeterminateness of the first case. Other embodiments of the method according to the invention make it possible to remove the residual indeterminateness associated with the second.

In one development, the trajectory objects are complete flight trajectories. The trajectory objects which are compared (i.e. sent to the deviation calculation function) may be complete trajectories (for example current or reference trajectories, such as manipulated by a flight management system for example).

In one development, the trajectory objects are trajectory sections comprising one or more legs (for example of TF and/or RF type). The step of comparison of the trajectories may be carried out on sequences of trajectory segments.

In one development, the trajectory objects are (or comprise) trajectory signatures. In one embodiment, each FMS generates one 32 bit word representing the CRC of the trajectory (or of a trajectory portion). The FWS then compares the 2 CRCs. A trajectory signature may be (or comprise) a cyclic redundancy check (CRC) file. This embodiment allows rapid comparisons and calculations. For example, if trajectory 1 has a value of 00001111, there are 4 bits of value equal to 1 . To obtain an uneven number of bits, it is necessary to add one bit (the uneven parity bit of the trajectory is 1). If trajectory 2 has a value of 00000111, there are 3 bits at 1 . To obtain an uneven number of bits, it is necessary to add one bit, the uneven parity bit of the trajectory is 0 . In the first case, the FMS 1 therefore transmits 1 to the FWS. In the second case, the FMS 2 therefore transmits 0 to the FWS. The two parity bits are not identical: the FWS may deduce therefrom that the two FMSs do not have the same trajectory without however receiving the complete trajectory.

In one development, the method furthermore comprises the steps consisting in receiving an indication of change of current leg, and in comparing the two trajectory objects before and after change of leg.

The indication of change may be received or determined in various ways. It may be received from a monitoring module (for example a system not party to the invention). The flying aeroplane progresses to the flight plan points of the trajectory. (Manual or automatic) commands from the pilot modify the trajectory, which is recalculated by the FMS (in the present case the dual system of independent FMSs): various legs are flown in succession and thus sequencing (change of leg) may be carried out (or detected or initialised or determined). The indication of change of current leg may for example originate from the detection of a change of trajectory that becomes equal to the provided trajectory after change of leg.

The comparison of the trajectory objects before and after sequencing may furnish information as regards faults.

In one development, the method furthermore comprises the step consisting in determining the existence of a failed trajectory (from the two initially identical flight trajectories determined independently of each other over time) if the two objects after change of leg are not equal. In other words, it is a question of an "inter-object" comparison. If the two (independently determined) trajectory objects after change of leg are not equal: there is a failed trajectory among the two.

In one development, the method furthermore comprises the step consisting in determining the failed trajectory (from the two initially identical flight trajectories determined independently of each other over time) if the two objects after change of leg are not equal, said determination comprising the steps consisting in comparing for each of the two trajectory objects, the next trajectory section such as planned before change of current leg and the current trajectory section such as flown after change of current leg; and in determining the failed trajectory as being that associated with the trajectory object for which the next trajectory section such as planned before change of current leg is not equal to the current trajectory section such as flown after change of current leg. In other words, it is a question of an "inter-object" comparison. If the two trajectory objects are not equal, it is possible to remove the indeterminateness by further examining the content of prior trajectory objects, i.e. to compare the trajectory sections such as provided by the FMS and those effectively flown.

If the two (independently determined) trajectory objects after change of leg are equal, it is not possible to make a conclusion (either the two trajectory objects are simultaneously false, or they are simultaneously correct; a fault on a single side is then not determined).

In the absence of indication of the occurrence of "sequencing" (that a change of current leg has taken place), no conclusion may be drawn.

In one development, the trajectory objects are trajectory sections comprising one or more TF and/or RF type legs.

In one development, the method furthermore comprises the step consisting in receiving a level of operational safety and the step consisting in comparing the trajectory objects is carried out using a fault tolerance threshold, said fault tolerance threshold being predefined depending on the received level of operational safety.

The deviation between the two trajectories must remain within certain limits, which are furnished by the flight performance requirements, which are input data. The subsets of trajectory segments that are compared are relevant for said level of operational safety.

In one development, the level of safety is associated with RNP values comprised between 0.1 and 1 nautical mile for an RNP-AR type procedure. For example, in certain advantageous embodiments, the safety level may be of RNP-0.3 level (three tenths of a nautical mile).

In one development, the step consisting in comparing the trajectory objects is carried out at the expiry of a predefined delay. The predefined delay covers the asynchrony of the systems. In other words, the comparison to make sense is carried out at the expiry of a predefined delay, which covers the synchronisation of the various systems implemented to determine the trajectories. For example, an FMS number 1 calculates one trajectory and an FMS number 2 also. The two calculations do not commence perfectly simultaneously. The predefined delay corresponds to the temporal tolerance that exists between the two chains. In other words, the trajectories are compared after "stabilisation" (updating of the calculations).

In one development, the method furthermore comprises the step consisting in notifying to the pilot of the aircraft the failed trajectory from the two trajectories determined independently of each other over time.

Other aspects of the invention are described below.

According to one particular embodiment, the history of the trajectory objects, for example the successive legs of the trajectory, is preserved (at least to a certain historical depth). This history makes it possible to remove possible indeterminateness as regards the failed chain. In particular, this embodiment makes it possible to detect a fault occurring simultaneously to trajectory "sequencing", i.e. a change of current leg.

In a context where the system performs sequencing of the elements of the trajectory (i.e. once the carrier has travelled a trajectory element, this element is removed and guidance performed for the following), the comparison will use a) two trajectories for each chain: the current trajectory and the trajectory provided in the next sequencing in order to detect a fault simultaneously to sequencing or b) n trajectories if multiple sequencing is possible in the navigation chains.

A computer program product is disclosed, said computer program comprising code instructions allowing one or more steps of the method to be performed, when said program is executed by a computer.

A system is disclosed comprising means for implementing one or more steps of the method. In one development, the system comprises two flight management systems or FMSs. In one development, the system comprises monitoring means for monitoring the two flight management systems or FMSs. In one development, the monitoring means comprise two flight warning systems or FWSs.

Figure 1:
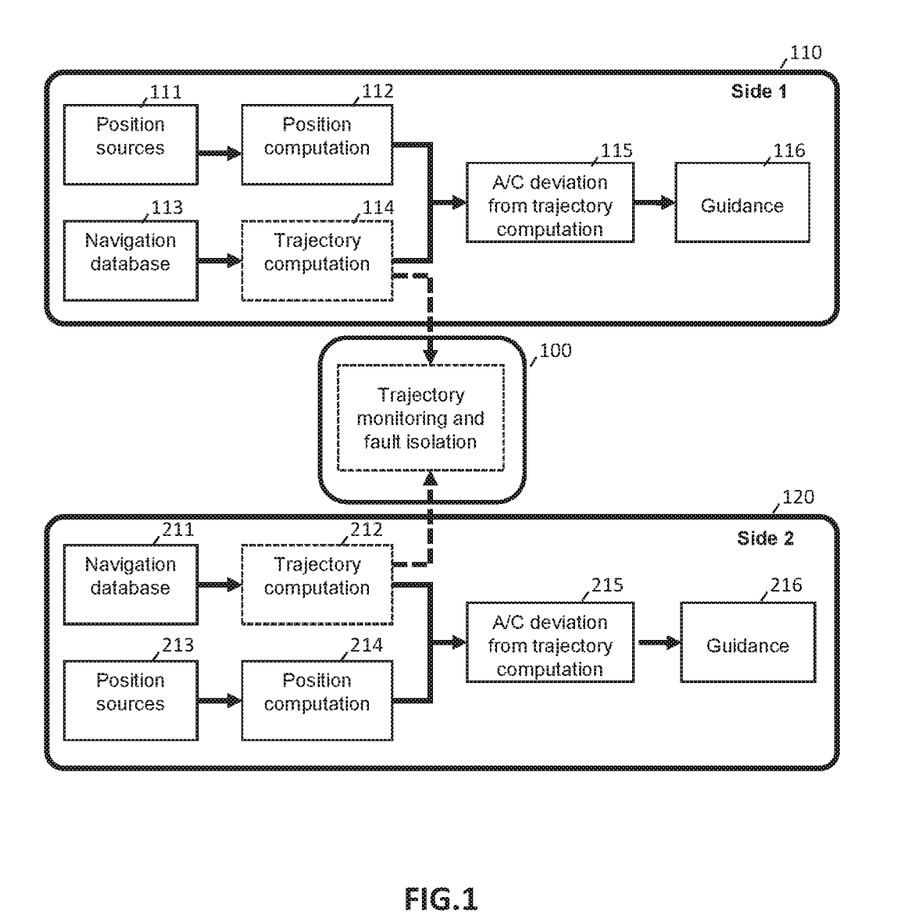
FIG. 1 illustrates the general operation of the invention.

FIG. 1 illustrates the general operation of the invention.

The function of trajectory management 100 (i.e. trajectory monitoring and fault isolation) results from the comparison of two navigation chains 110 and 120 ("dual system"). Each navigation chain (110,120) comprises various data and instructions. Sources of data as regards the position of the aircraft (111,211) allow the calculation of the effective position (112,212) and navigation information (113,213) allows the calculation of the current trajectory (114,114). From this current trajectory and from the information on the position of the aircraft, a deviation is determined (115,215) and a guidance instruction is sent to the pilot and/or to the automatic guidance system (116,216).

In other words, according to one aspect of the invention, a monitoring function, which is optionally independent from the two navigation chains, compares the reference trajectories used by each chain, so as to detect differences and identify the chain that has faulted.

The comparison of the trajectory objects, i.e. the step of detecting a difference and/or identifying a chain that has faulted, may be carried out in various ways over time (i.e. periodically or aperiodically, continuously or intermittently). The monitoring may be carried out exclusively temporally (i.e. only with respect to time) and/or depending on the occurrence of events during the flight. In one embodiment of the invention, by means of one or more flight warning systems (FWSs), the latter initiate and control the frequency, i.e. the rhythm, of the comparisons. In certain embodiments, the verification frequency is about one second.

Figure 2A:
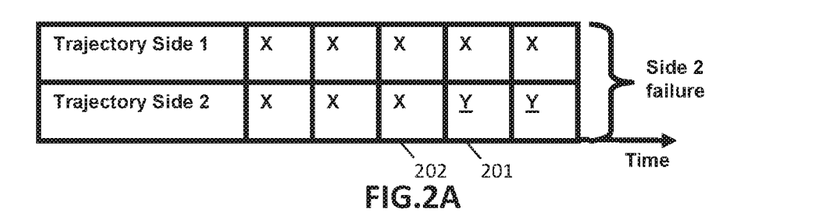
FIGS. 2A and 2B illustrate examples of detection of a fault.
Figure 2B:
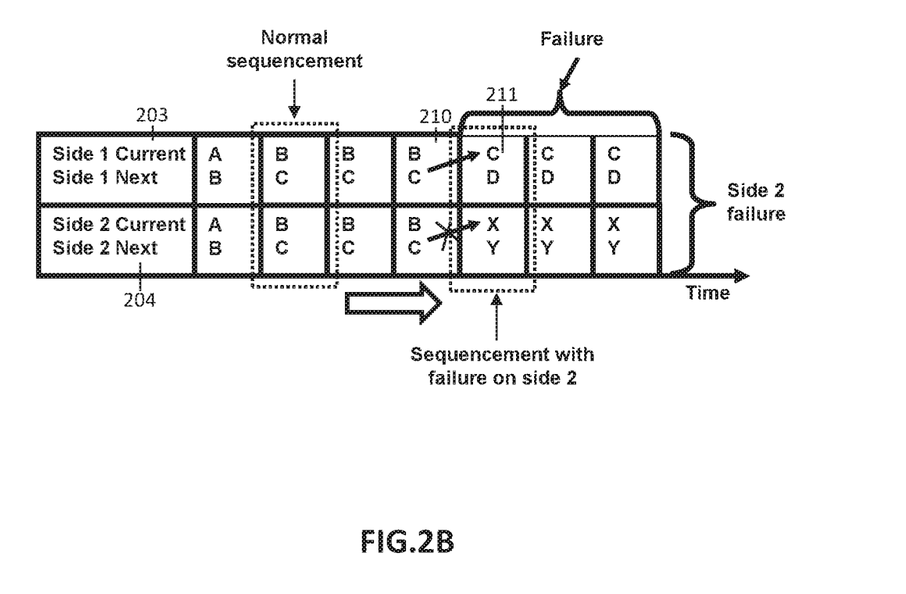

FIGS. 2A and 2B illustrate examples of fault detection. In the absence of a fault, the two reference trajectories are identical and stable.

A flight plan consists of a series of segments called "legs" allowing a point of departure to be connected to a point of arrival. The sequences of legs are themselves standardised. Legs are therefore associable with a flight trajectory.

FIG. 2A illustrates an example of comparison of trajectories, according to a first embodiment of the invention. When a fault occurs, a difference 201 between the trajectories appears and it is possible to identify the side that has faulted, for example by comparing it to the last state without fault (state 202).

FIG. 2B illustrates another embodiment, for which the monitoring method according to the invention proceeds by analysis of the sequence of the legs ("sequencing"). The terms "current" 203 and "next" 204 for example apply to the trajectory legs, and respectively designate the current trajectory 203 (or else an element that is representative thereof from the last point sequenced up to arrival and the current trajectory) and an element representative of the next point 204 on the trajectory (to be sequenced up to arrival). The term "sequencing" means a change of current leg, i.e. that the next leg after the current leg becomes the current leg. The expression "current leg" is translated "leg courant" or "leg en cours" or "leg actif" in French. The expression "next leg" is translated "prochain leg" or "leg suivant" in French.

In one embodiment, it is possible to detect a fault by analysing the sequence of the legs. This sequential analysis allows the identification of a fault simultaneously to a change of leg. The example illustrated in the figure shows that the occurrence of a fault is detected at the point 211 (sequencing error): the trajectory sequences diverge and the chain number 2 appears to have faulted. Specifically, in the sequence at time 210, chain 1 indicates a current trajectory object B and a next trajectory object C, and likewise chain 2. At a subsequent instant 211, following a change of current leg, in chain 1 the current trajectory object has become C and the next trajectory object is indicated as being D whereas for chain 2 the active trajectory object is X and not C. The comparison makes it possible to determine straightaway that chain 2 has failed and that chain 1 is a priori correct.

If for example at the instant 211 chain 1 indicates C/D and chain 2 indicates CN, there is (still) no trajectory fault. In contrast, at the next change of leg, a fault will be recorded (but it will not be possible a priori to detect which of the two chains has faulted). This (temporary) situation (given by way of example) would result from a fault in the trajectory generation function because the latter is designed to normally give the same results for the 'Next' trajectory if the 'Current' trajectory is the same.

According to certain embodiments, the detection and/or comparison of the chain that has faulted is carried out after a certain predefined delay. Specifically, in flight contexts, where manual modifications to trajectories are permitted and assumed synchronised between the two chains (with a sufficient level of operational safety), a particular delay before detection of the side that has faulted may be necessary in order to wait for the trajectories to be "updated".

Figure 3A:
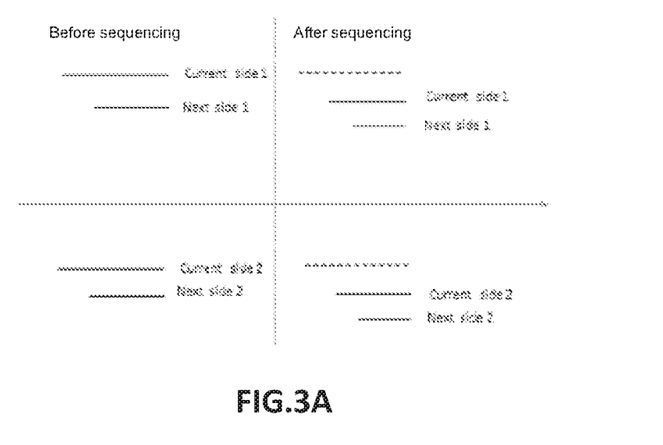
FIGS. 3A and 3B show a schematic of the trajectory management function.
Figure 3B:
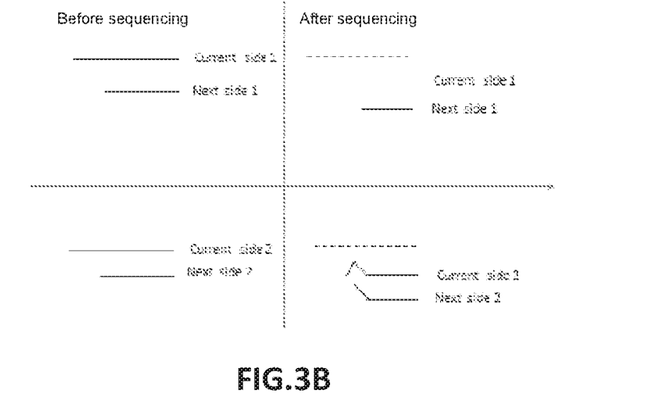

FIGS. 3A and 3B show a schematic of the trajectory management function.

Each instance of the trajectory calculation system furnishes to the "trajectory monitoring and fault isolation" function 100 a representation of the trajectory. This may be a) the complete trajectory sent to the deviation calculation function; or b) a subset that is relevant for the envisaged level of operational safety (for example only for TF and RF type legs) or c) a signature representing the trajectory or the chosen subset.

In one particular case, one or more trajectory-section or trajectory signatures (i.e. condensates or compact representations) may be used by the method according to the invention. Such signatures may for example comprise a cyclic redundancy check (CRC), which makes it possible to detect transfer or transmission errors by adding, combination and comparison of redundant data, obtained by virtue of a hashing procedure. The CRCs are generally evaluated (sampled) before and after the transmission or transfer, then compared to ensure that the data are strictly identical. The most frequently used CRC calculations are designed in order to be able to always detect errors of certain types, such as those due, for example, to interference during transmission.

In this context of the invention, a current CRC and a next CRC may be calculated for each of the instances of the trajectory calculation system for the element or chosen set of elements. The length (in bits) of the CRC may for example be selected or determined depending on the detection level required by the safety analysis.

The "trajectory monitoring and fault isolation" function 100 memorises the elements received by each trajectory calculation chain. When a change is detected in one of the two chains (i.e. the received data are different from the memorised data), it is determined which calculation function has failed.

The failed calculation function is determined by making a comparison of the elements transmitted by trajectory calculation function No. 1 with those transmitted by function No. 2. In the case of a set of complex data, the comparison is carried out using the elements pairwise.

FIG. 3A shows that once a difference is spotted, the "trajectory monitoring and fault isolation" function 100 considers the trajectory calculation chain that is not doing what was expected to be the one operating erroneously. If the element representative of the x-side next trajectory before "sequencing" is equal or identical to the x-side next element after "sequencing", then the trajectory management function has done what it was expected to do and a fault alert is not sent. An optional delay may be added in order to ensure that the two trajectory calculation functions are indeed in a stable state (i.e. that the sequencing of the point on the trajectory has indeed occurred on both sides) before making the comparison.

FIG. 3B shows that if the element representative of the x-side next trajectory before "sequencing" is not equal to the x-side next element after "sequencing", then the trajectory management function has not done what it was expected to do: a fault may be determined by comparing the two navigation chains.

Figure 4:
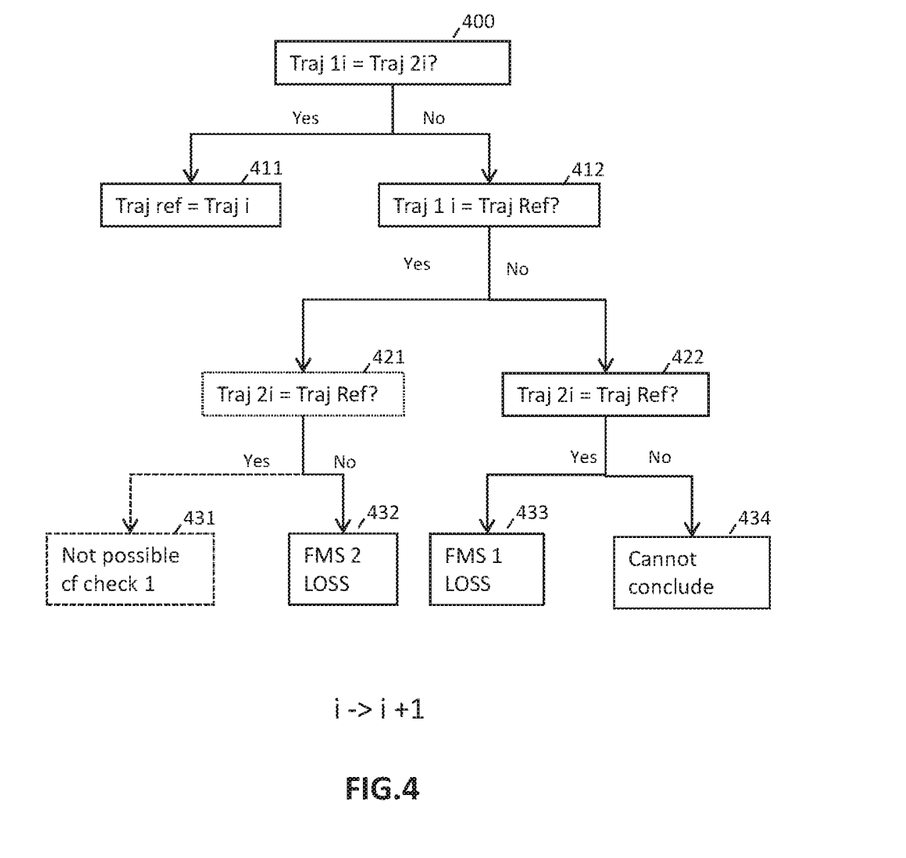
FIG. 4 shows exemplary steps of comparison of trajectories.

FIG. 4 shows exemplary trajectory comparison steps.

In the example that is shown, the trajectory segments (or legs for example) are compared in step 400. If they are identical for each chain, the index i is incremented (i.e. there is no fault). If a difference is detected in step 412 it is determined whether the trajectory segments (or legs) of chain 1 are equal to the reference trajectory element in step 421. Chain 2 may also be checked (it is determined whether the trajectory element of chain 2 is equal to the reference trajectory element; if not 432, chain 2 is determined to have failed; if so 431 it is a question of a contradiction and therefore an impossibility). If the trajectory element of chain 1 is not identical to the reference trajectory element in step 421, chain 2 is checked (it is determined whether the trajectory element of chain 2 is equal to the reference trajectory element; if so 433, chain 1 is determined to have failed and if not 434, no conclusion can be made because it is a question of a "double fault" or the flight plan has been modified differently on each side).

In one embodiment of the invention, the trajectory legs are compared.

Figure 5:
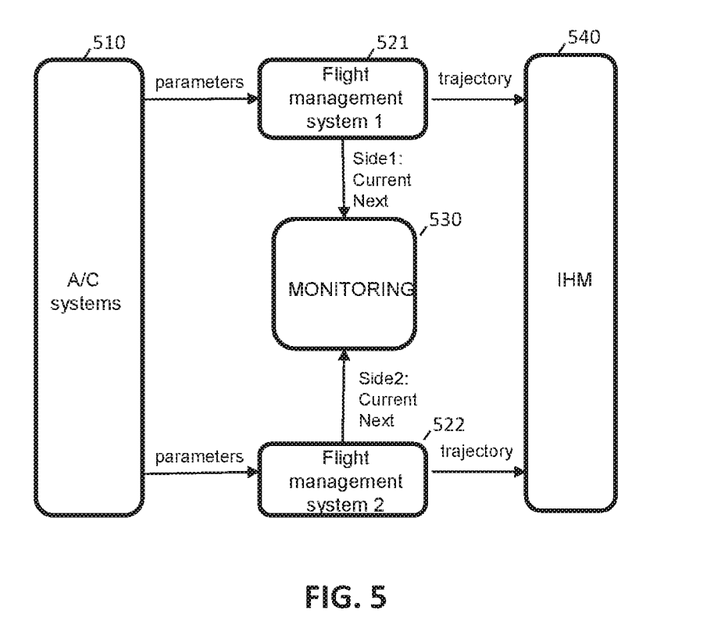
FIG. 5 illustrates an exemplary implementation of the method according to the invention in a flight management system.

FIG. 5 illustrates an exemplary implementation of the method according to the invention in a flight management system.

In one optional embodiment, in order to detect and isolate a fault simultaneously to a change of current leg, the function 100 makes sure that only only one of the two trajectory calculation chains is concerned. According to this embodiment, the steps of the method are the following: each "trajectory monitoring and fault isolation" function 100 uses two elements of current and next type: the elements memorised before sequencing and the current elements. At the start of a flight, all the elements are initialised to the current state (i.e. memorised current element=current element; memorised next element=current next element). A trajectory deviation is detected if i) the two trajectory calculation functions are in "dual" type operation (i.e. they are both operating on the same trajectory), ii) a trajectory calculation chain comprises a memorised next element that is different from its current element, and iii) the second trajectory calculation chain comprises a memorised next element that is equal to its current element.

In certain (optional) embodiments, a trajectory modification made by the crew may be determined in certain cases, for example if a) the two trajectory calculation functions are in "dual" type operation (i.e. they are both operating on the same trajectory), b) the memorised element of the next type of a trajectory calculation chain is different to its current current element, c) the memorised next type element of the other trajectory calculation chain is also different from its current current element and d) the current current and next elements of the two trajectory calculation functions are consistent. This embodiment illustrates that the method according to the invention allows the existence of a trajectory modification to be confirmed.

In one (optional) embodiment, a simultaneous loss of the two trajectory calculation functions may be determined if 1) the two trajectory calculation functions are in "dual" type operation (i.e. they are both operating on the same trajectory), 2) the memorised next type element of a trajectory calculation chain is different from its current current element, 3) the memorised next type element of the other trajectory calculation chain is different from its current current element, 4) the current current and next elements of the two trajectory calculation functions are different. The method aims to detect and isolate a single fault but incidentally may also allow a double fault to be detected.

Figure 6:
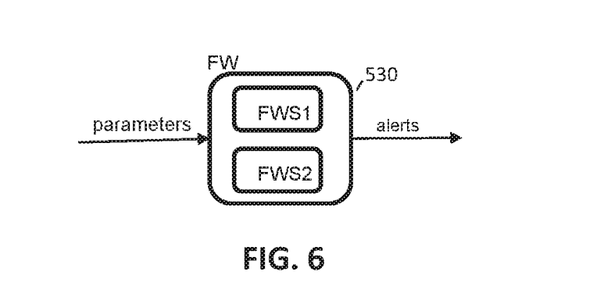
FIG. 6 illustrates one variant implementation.

FIG. 6 shows one implementational variant.

According to one particular embodiment, the trajectory calculation function is implemented in a redundantly implemented flight management system (521, 522) and a monitoring module or controller 530 that performs the comparisons (with the required granularity; also at a checking frequency that is specific to this system).

The monitoring module 530 in one variant may be a redundant system of a flight warning system (FWS) intended to send alerts. To each FMS corresponds one FWS. In one particular embodiment, the operating mode is of primary/backup type (i.e. one of the FWSs is active whereas the other remains passive and takes over only in case of failure of the active FWS). This alert-oriented embodiment is merely one example. More generally, the module 530 may have more functionalities than the communication of alerts. The module 530 may communicate with other on-board avionics systems.

The present invention may be implemented using software and/or hardware elements. It may be distributed as a computer program product on a computer-readable medium. The medium may be electronic, magnetic, optic or electromagnetic.

The invention claimed is:

1. A computer-implemented method for monitoring a flight trajectory of an aircraft comprising the steps reiterated in time of:
   receiving and comparing two trajectory objects in at least one Flight Management System, said trajectory objects being associated with two initially identical flight trajectories determined independently of each other over time;
   at a given instant, in case of difference between the two trajectory objects in the at least one Flight Management System, determining a failed trajectory from the two flight trajectories by comparison with a last known state without fault, the last known state without fault corresponding to two identical trajectory objects; and
   notifying a pilot of the aircraft of a determination of the failed trajectory.

2. The computer-implemented method according to claim 1, wherein the trajectory objects comprise complete flight trajectories.

3. The computer-implemented method according to claim 1, wherein the trajectory objects comprise trajectory sections comprising one or more flight plan segments.

4. The computer-implemented method according to claim 3, wherein the trajectory objects comprise trajectory sections comprising one or more TF (Track to Fix) and/or RF (Radius to Fix) type legs.

5. The computer-implemented method according to claim 1, wherein the trajectory objects comprise trajectory signatures.

6. The computer-implemented method according to claim 1, further comprising the steps of:
   receiving an indication of a change of a current leg,
   comparing in a Flight Warning System the two trajectory objects before and after the change of a current leg.

7. The computer-implemented method according to claim 6, further comprising determining an existence of a failed trajectory from the two initially identical flight trajectories determined independently of each other over time if the two objects after change of leg are not equal.

8. The computer-implemented method according to claim 6, further comprising determining the failed trajectory from the two initially identical flight trajectories determined independently of each other over time if the two objects after change of leg are not equal, said determination comprising:
   comparing for each of the two trajectory objects, a next trajectory section such as planned before change of current leg and a current trajectory section such as flown after change of current leg; and
   determining the failed trajectory as being that associated with the trajectory object for which the next trajectory section such as planned before change of current leg is not equal to the current trajectory section such as flown after change of current leg.

9. The computer-implemented method according to claim 1, further comprising receiving a level of operational safety and the comparing the trajectory objects being carried out using a fault tolerance threshold, said fault tolerance threshold being predefined depending on the received level of operational safety.

10. The computer-implemented method according to claim 9, wherein the level of safety being associated with RNP (Required Navigation Performance) values comprised between 0.1 and 1 nautical mile for an RNP-AR (Required Navigation Performance - Authorization Required) type procedure.

11. The computer-implemented method according to claim 1, wherein the comparing the trajectory objects being carried out at an expiry of a predefined delay.

12. The computer-implemented method according to claim 1, wherein notifying the pilot further comprises notifying the pilot of the aircraft of the failed trajectory from the two trajectories determined independently of each other over time.

13. A non-transitory computer program product, said non-transitory computer program comprising code instructions for monitoring a flight trajectory of an aircraft when said non-transitory computer program is executed by a computer, the code instructions comprising:
   receiving and comparing two trajectory objects in at least one Flight Management System, said trajectory objects being associated with two initially identical flight trajectories determined independently of each other over time;
   at a given instant, in case of difference between the two trajectory objects in the at least one Flight Management System, determining a failed trajectory from the two flight trajectories by comparison with a last known state without fault, the last known state without fault corresponding to two identical trajectory objects; and
   notifying a pilot of the aircraft of a determination of the failed trajectory.

14. A system for monitoring a flight trajectory of an aircraft, the system comprising two flight management systems or FMSs, and comprising:
   the system being configured to receive and compare two trajectory objects in at least one Flight Management System, said trajectory objects being associated with two initially identical flight trajectories determined independently of each other over time;

the system further being configured to, at a given instant, in case of difference between the two trajectory objects in the at least one Flight Management System, determine a failed trajectory from the two flight trajectories by comparison with a last known state without fault, the last known state without fault corresponding to two identical trajectory objects; and the system further being configured to notify a pilot of the aircraft of a determination of the failed trajectory.

15. The system according to claim 14, her comprising two Flight Warning Systems configured to monitor the two flight management systems.

\* \* \* \* \*

UNITED STATES PATENT AND TRADEMARK OFFICE
CERTIFICATE OF CORRECTION

PATENT NO.        : 9,965,963 B2
APPLICATION NO.   : 15/171887
DATED             : May 8, 2018
INVENTOR(S)       : Jacotot et al.

Page 1 of 1

It is certified that error appears in the above-identified patent and that said Letters Patent is hereby corrected as shown below:

In the Claims

In Line 13, Column 11 in Claim 15, "claim 14, her comprising" should be --claim 14, further comprising--.

Signed and Sealed this
Twenty-sixth Day of June, 2018

Andrei Iancu
*Director of the United States Patent and Trademark Office*